US006446038B1

(12) United States Patent
Bayya et al.

(10) Patent No.: US 6,446,038 B1
(45) **Date of Patent: *Sep. 3, 2002**

(54) METHOD AND SYSTEM FOR OBJECTIVELY EVALUATING SPEECH

(75) Inventors: Aruna Bayya, Louisville; Marvin Vis, Boulder, both of CO (US)

(73) Assignee: Qwest Communications International, Inc., Denver, CO (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 819 days.

(21) Appl. No.: 08/627,249

(22) Filed: Apr. 1, 1996

(51) Int. Cl.[7] .................................................. G10L 15/00

(52) U.S. Cl. ........................ 704/232; 704/231; 704/236

(58) Field of Search ................................ 395/2.4, 2.41, 395/2.37, 2.35

(56) References Cited

U.S. PATENT DOCUMENTS

| | | | | | |
|---|---|---|---|---|---|
| 4,718,094 A | * | 1/1988 | Bahl et al. | ................. | 395/2.65 |
| 4,815,134 A | * | 3/1989 | Picone et al. | .............. | 395/2.28 |
| 4,860,360 A | | 8/1989 | Boggs | ......................... | 381/48 |
| 4,937,872 A | * | 6/1990 | Hopfield et al. | ........... | 395/2.41 |
| 4,975,961 A | * | 12/1990 | Sakoe | ....................... | 395/2.41 |
| 5,185,848 A | * | 2/1993 | Aritsuka et al. | ............... | 395/2 |
| 5,228,087 A | * | 7/1993 | Bickerton | .................. | 395/2.41 |
| 5,255,346 A | * | 10/1993 | Wu et al. | ..................... | 395/23 |
| 5,381,513 A | * | 1/1995 | Tsuboka | .................... | 395/2.41 |
| 5,404,422 A | * | 4/1995 | Sakamoto et al. | ......... | 395/2.41 |
| 5,450,522 A | * | 9/1995 | Hermansky et al. | ......... | 395/2.2 |
| 5,537,647 A | * | 7/1996 | Hermansky et al. | ......... | 395/2.2 |
| 5,621,854 A | * | 4/1997 | Hollier | ...................... | 395/2.37 |
| 5,621,857 A | * | 4/1997 | Cole et al. | ................. | 395/2.41 |

FOREIGN PATENT DOCUMENTS

EP 0722164 A1 * 7/1996 ............. G10L/5/06

OTHER PUBLICATIONS

"Calculation Of Opinion Scores For Telephone Connections", by D.L. Richards, et al, Proc. IEE, vol. 121, No. 5, May 1974, pp. 313–323.

"Objective Estimation Of Perceptually Specific Subjective Qualities", by S.R. Quackenbush et al, IEEE 1985, pp. 419–422.

"An Objective Measure For Predicting Subjective Quality Of Speech Coders", by Shihua Wang et al, IEEE 1992, pp. 819–829.

"Output–Based Objective Speech Quality", by Jin Liang et al, IEEE 1994, pp. 1719–1723.

* cited by examiner

*Primary Examiner*—Marsha D. Banks-Harold
*Assistant Examiner*—Michael N. Opsasnick
(74) *Attorney, Agent, or Firm*—Brooks & Kushman P.C.

(57) ABSTRACT

A method and system for objectively evaluating the quality of speech in a voice communication system. A plurality of speech reference vectors is first obtained based on a plurality of clean speech samples. A corrupted speech signal is received and processed to determine a plurality of distortions derived from a plurality of distortion measures based on the plurality of speech reference vectors. The plurality of distortions are processed by a non-linear neural network model to generate a subjective score representing user acceptance of the corrupted speech signal. The non-linear neural network model is first trained on clean speech samples as well as corrupted speech samples through the use of backpropagation to obtain the weights and bias terms necessary to predict subjective scores from several objective measures.

20 Claims, 3 Drawing Sheets

METHOD AND SYSTEM FOR OBJECTIVELY EVALUATING SPEECH

TECHNICAL FIELD

This invention relates to methods and systems for evaluating the quality of speech, and, in particular, to methods and systems for objectively evaluating the quality of speech.

BACKGROUND ART

Assessing the quality of speech communications systems is of great importance in the field of speech processing. Speech quality is used to optimize the design of speech transmission algorithms and equipment, and to aid in selecting speech coding algorithms for standardization. It is also an important factor in the purchase of speech systems and services and to predict listener satisfaction. Traditionally, speech quality has been determined using subjective measures based on human listener rating schemes such as, for example, the Mean Opinion Score (MOS) which ranges from 1 to 5 representing unacceptable, poor, fair, good, and excellent, or the Diagnostic Acceptability Measure (DAM) which ranges from 1 to 100.

Since different people have different preferences, there is often significant variation between individual quality scores. To do the subjective testing correctly requires listener crews who are carefully selected and constantly calibrated in order to determine any drift in the individual performance. Also, statistical test design for repeatable results requires listeners to hear many combinations of test conditions using appropriate laboratory facilities. This makes the subjective measures quite expensive and suggests that "objective" measures could be used to aid the quality estimation task. The term "objective" refers to mathematical expressions that attempt to estimate or predict subjective speech quality.

Many known algorithms base quality estimates on input-to-output measures. That is, speech quality is estimated by measuring the distortion between an "input" and an "output" speech record, and using regression to map the distortion values into estimated quality. However, in a realistic environment, access to a clean/uncorrupted input signal is not possible. Therefore, objective measures should be based only on the available corrupted output signal. Output-based measures are useful in applications when we only know the received speech record and there is no way to know the source speech record, for example, as in monitoring cellular telephone connections to ensure they maintain adequate performance.

Several known output-based measures have been proposed. These methods, however, either fail to utilize more than one distortion measure for determining the quality of speech or use linear or very simple non-linear models to predict the score of a generally accepted subjective quality rating scheme.

DISCLOSURE OF THE INVENTION

It is thus a general object of the present invention to provide a new and improved method and system for objectively measuring speech quality based on an output speech signal only.

It is another object of the present invention to provide an output-based objective measure that correlates highly with subjective scores over all possible distortions and noise types so as to accurately predict listener preference.

In carrying out the above objects and other objects, features and advantages, of the present invention, a method is provided for objectively measuring the quality of speech. The method includes providing a plurality of speech reference vectors and receiving a corrupted speech signal. The method also includes determining a plurality of distortions of the corrupted speech signal derived from a plurality of distortion measures based on the plurality of speech reference vectors. Finally, the method includes generating a score based on the plurality of distortions.

In further carrying out the above objects and other objects, features and advantages, of the present invention, a system is also provided for carrying out the above described method. The system includes means for providing a plurality of speech reference vectors and means for receiving a corrupted speech signal. The system also includes means for determining a plurality of distortions of the corrupted speech signal based on the plurality of speech reference vectors. Still further, the system includes a non-linear model responsive to the plurality of distortions to generate a score based on the plurality of distortions.

The above objects and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
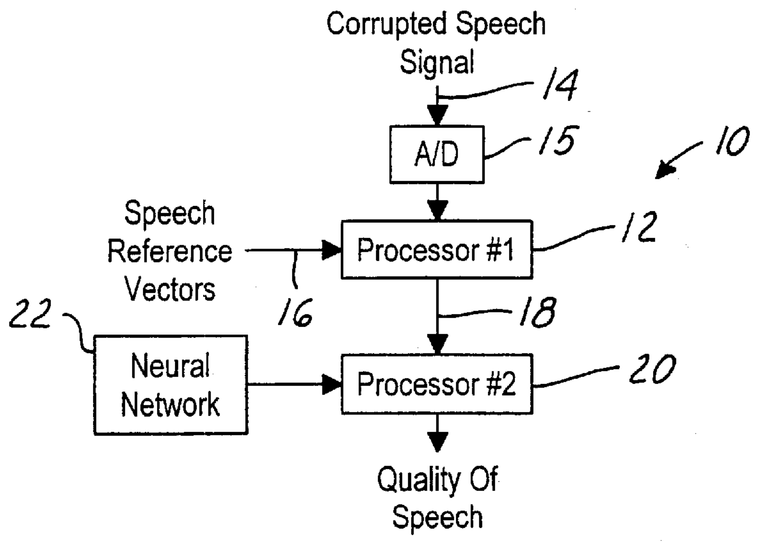
FIG. 1 is a simplified block diagram of the system of the present invention.

Referring now to FIG. 1, there is shown a simplified block diagram of the system of the present invention, denoted generally by reference numeral 10. The system 10 includes a first processor 12 which receives an input corresponding to the corrupted speech signal 14 and a set of speech reference vectors 16. Since speech is typically in an analog format, the corrupted speech signal is input into the first processor 12 of the system 10 using an analog to digital converter 15, such as a microphone, and converted into digital form. The set of speech reference vectors 16 is necessary since input speech signal is not available in an output-based objective measure.

Figure 2:
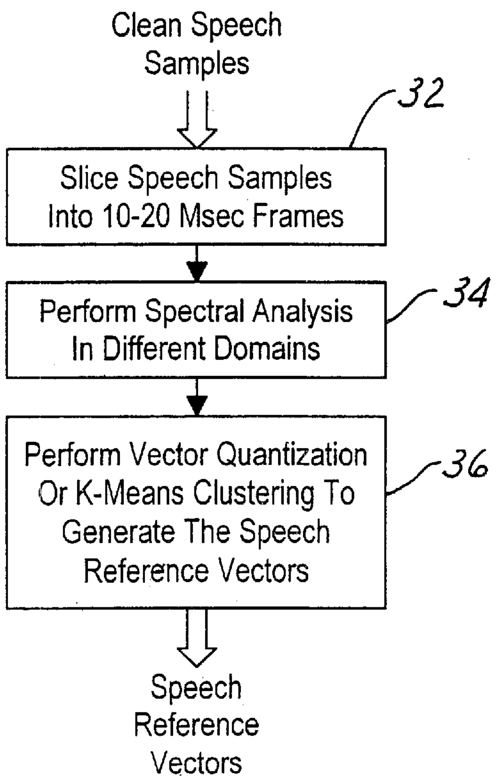
FIG. 2 is a block flow diagram illustrating the training process utilized to obtain the speech reference vectors of the present invention.

The speech reference vectors 16 are obtained from a large number of clean speech samples. The clean speech samples are obtained by recording speech over cellular channels in a quiet environment. A training process is performed on the noise-free, distortion-free speech samples to obtain the speech reference vectors 16. A block flow diagram illustrating the training process utilized to obtain the speech reference vectors 16 is shown in FIG. 2. The clean speech samples are first sliced into 10–20 msec speech segments referred to as frames, as shown at block 32, to obtain a stationary signal.

Various representations of these speech samples are obtained by performing spectral analysis in different domains, as shown at block 34. For example, the speech samples may be analyzed utilizing LP (Linear Predictive) Analysis or PLP (Perceptional Linear Predictive) Analysis. The speech samples may be analyzed according to any other known spectral analysis techniques. In each case, the cepstral coefficient vectors are used as features.

Next, the reference samples are clustered utilizing a vector quantization, k-means clustering technique, or any other known clustering technique, to obtain the set of speech reference vectors, as shown at block 36. A clustering technique is used to cluster the analyzed speech samples into a plurality of clusters such that within each cluster the sound patterns are similar.

Figure 3:
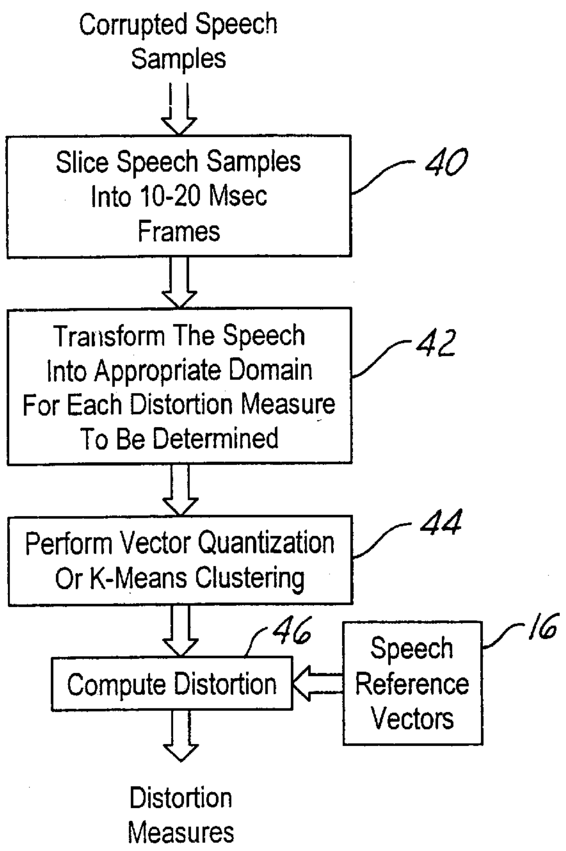
FIG. 3 is a block flow diagram illustrating distortion measures implemented in the method of the present invention.

Returning again to FIG. 1, the first processor 12 receives the corrupted speech signal 14 and determines an amount of distortion present in the corrupted speech signal according to a plurality of distortion measures based on the set of speech reference vectors 16. The first processor 12 then generates corresponding signals 18 representing the amount of distortion in the corrupted speech signal for each of the plurality of distortion measures utilized. Referring now to FIG. 3, there is shown a block flow diagram illustrating distortion measures of the corrupted speech implemented in the present invention. First, the corrupted speech samples are sliced into 10–20 msec segments, or frames, as shown at block 40.

The speech samples are then transformed into an appropriate domain, e.g., frequency or time, for each distortion measure to be determined, as shown at block 42. The present invention allows for several different distortion measures to be implemented. The distortion measures implemented include, but are not limited to the following:

1) Segmental Signal-to-Noise Ratio (SNR) defined as:

$$SNR_{seg} = \frac{1}{M}\sum_{m=1}^{M}\log\left\{1 + \frac{\sum_{n=1}^{N} x^2(n)}{\sum_{n=1}^{N}[y(n) - x(n)]^2}\right\} \tag{1}$$

where x(n) is the speech reference signal and the y(n) is the processed/corrupted signal, N is the frame length and M is the number of frames;

2) Log spectral distance (SD) defined as:

$$SD = 10\log\left\{\frac{1}{K}\sum_{k=0}^{K}[S_y(k) - S_x(k)]^2\right\} \tag{2}$$

where $S_Y(k)$ is the power spectra of corrupted signals and $S_x(k)$ is the power spectra of the speech reference signals;

3) Itakura distance (IS) defined as:

$$IS = \frac{a_x^T R_y a_x}{a_y^T R_y a_y} \tag{3}$$

where $a_y$ and $a_x$ contain the LPC (Linear Predictive Coding) coefficients for y(n) and x(n), respectively, and $R_y$ is the autocorrelation matrix of the corrupted/processed signal;

4) Weighted slope spectral distance (SD) on linear frequency scale spectrum defined as:

$$SD_{wslp} = \sum_{k=0}^{k} a^*[(S_y(k+1) - S_y(k)) - (S_x(k+1) - S_x(k))]^2 \tag{4}$$

where a is computed from the maximum log magnitude;

5) Coherence Function (CF) defined as:

$$CF = \frac{\left|\sum_n X_n^*(f)Y_n(f)\right|^2}{\sum_n |X_n(f)|^2 \sum_n |Y_n(f)|^2} \tag{5}$$

where Y(f) and X(f) are the complex spectra of the corrupted and reference signals, respectively; and 6) LPC and PLP (Perceptual Linear Prediction) cepstral distances (CD) defined as:

$$CD = \sum_{n=1}^{P}[c_y(n) - c_x(n)]^2 \tag{6}$$

where $c_y(n)$ and $c_x(n)$ are the cepstral values of the signal y(n) and x(n) and P is the number of cepstral coefficients.

A vector quantization or k-means clustering technique is performed on the speech frames transformed into various domains, as shown at block 44. Finally, the distortion is computed according to any or all of the distortion measures listed above, as shown at block 46, based on the speech reference vectors 16.

The distortion measures defined above were computed for each speech sample. A correlation matrix was computed for locally normalized (across all the speech samples for one type of noise/distortion) and globally normalized (across all noise/distortion types)

These correlation matrices indicate redundancy of some of the distortion measures for some types of noise sources. For example, LPC and PLP cepstral distances are highly correlated with each other in white Gaussian noise and car noise cases.

Correlations with subjective scores were then computed for each of the distortion measures under different noise source/distortion conditions and processing. The distortion measures resulted in correlation coefficients ranging from 0.12 to 0.54. These values were even lower for cellular recordings. After studying the effect of various processing and distortion sources on simple distortion measures, it was concluded that no single distortion measure can be used for all different distortion sources. That is, none of the distortion measures defined above indicate the quality of the speech signal for all types of distortions and corruptions.

Since the quality of speech needs to be assessed in several dimensions (e.g., intelligibility, naturalness, and background noise) and the sensitivity of the distortion measure is highly dependent on the type of corruption and the processing used to improve the quality, a non-linear model is appropriate for predicting the subjective scores corresponding to the quality of speech based on the objective measurements. This non-linear model is based on neural networks. A neural network is a parallel, distributed information processing structure consisting of processing elements (which can possess a local memory and can carry out localized information processing operations) interconnected via unidirectional signal channels called connections.

Figure 4:
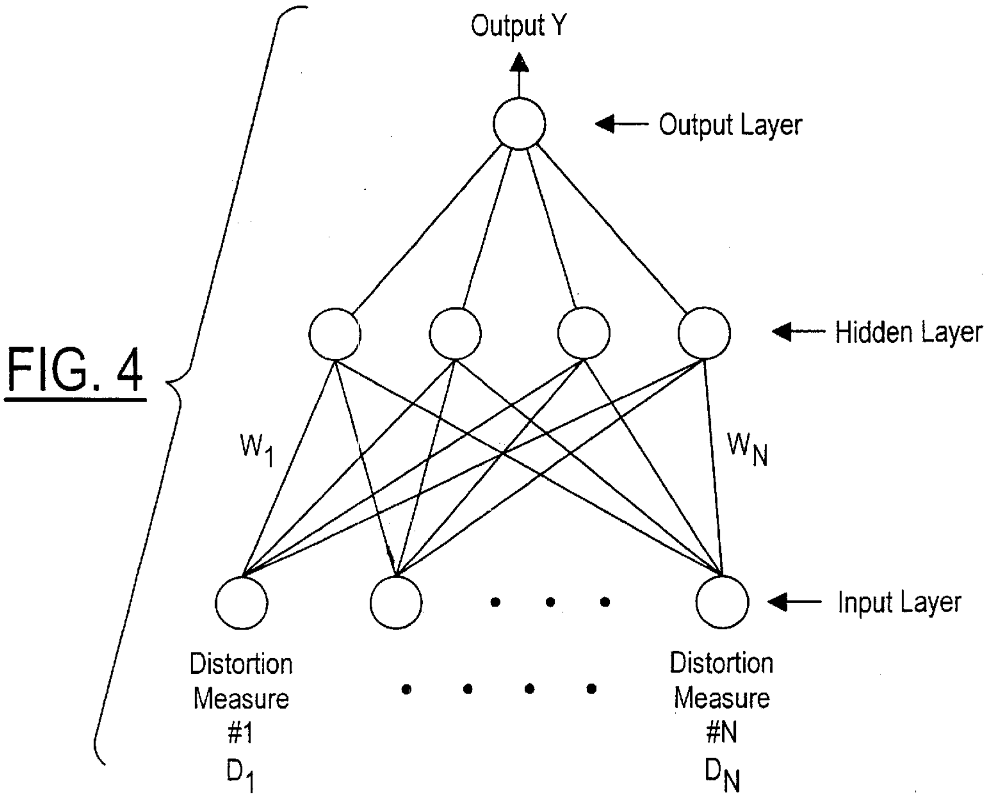
FIG. 4 is a schematic diagram of the neural network implemented in the operation of the present invention.

The neural network chosen for the present invention is a three-layer network, as shown in FIG. 4, wherein the input to the neural network consists of the above-defined distortion measures ($D_1$–$D_N$) and the output (Y) represents a subjective score. The output Y depends on how the neural network is modeled. For example, if the neural network is trained to predict MOS (Mean Opinion Scores), the output Y is a value between 1 and 5. The middle layer is a hidden layer utilized to increase the non-linearity of the model. The network is trained using known backpropagation techniques to obtain the weights ($\omega_i$) and the bias terms ($\theta$) of each connection of the neural network.

Figure 5:
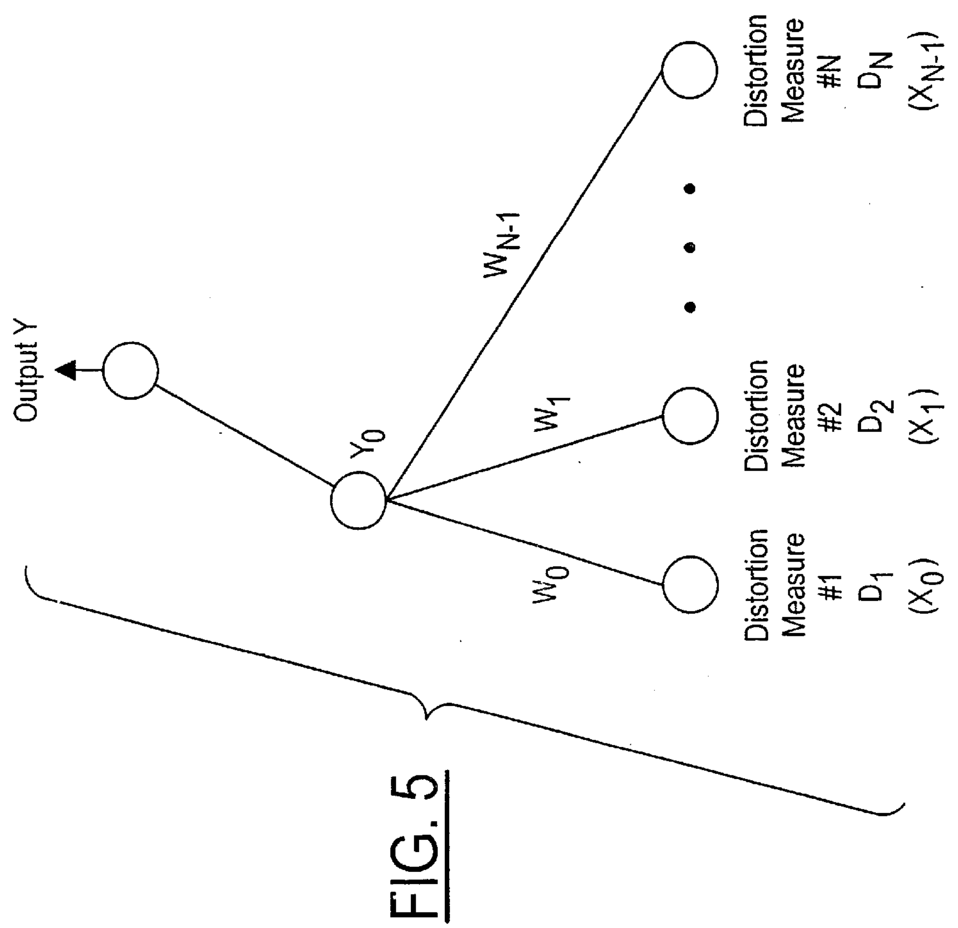
FIG. 5 is a schematic diagram of one element of the neural network shown in FIG. 4.

Subjective studies were conducted on approximately 200 speech samples corrupted by different noise sources, both before and after signal processing and compression. The subjective scores and the corresponding distortion measures were used to train the neural network. FIG. 5 illustrates one element of the neural network shown in FIG. 4. As discussed above, the neural network is made up of many elements interconnected through many connections. The output of each of the neural network elements is represented according to the following:

$$Y_i = f\left(\sum_{i=o}^{N-1} \omega_i x_i - \theta\right), \text{ where } \omega_i = \text{weight and}$$

$$\theta = \text{bias of each connection.}$$

The output is then determined by summing the outputs $Y_i$ of each of the elements.

Referring again to FIG. 1, the system 10 further includes a second processor 20 for receiving the measured distortion signal 18 and determining the quality of the speech based on the plurality of distortions processed by the neural network 22. The quality of the speech determined by the second processor 20 is an indication of the subjective quality of the speech.

The results of the output-based objective measure implemented in the present invention was verified by implementing several objective measures and studying the signals for corruption by various noise types and distortions. Subjective tests were then conducted to obtain listener's acceptability scores which were used in validating the objective scores.

Figure 6:
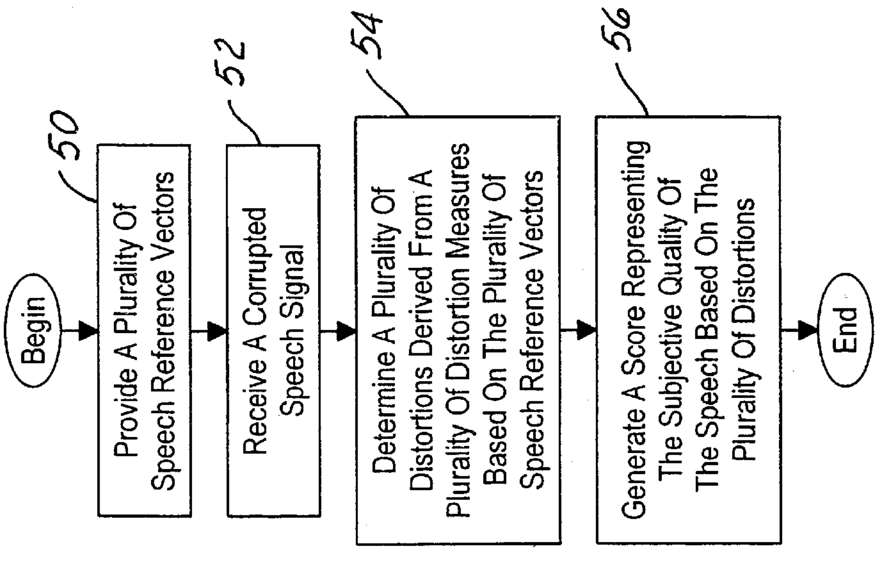
FIG. 6 is a block flow diagram illustrating the operation of the present invention.

Turning now to FIG. 6, there is shown a block flow diagram illustrating method of the present invention. The method includes providing a plurality of speech reference vectors, as shown at block 50. As described above, the speech reference vectors are obtained from clean speech samples.

Next, a corrupted speech signal is received, as shown at block 52. The corrupted speech signal may be corrupted by background noise as well as channel impairments. Although channel noise is reduced with digital transmissions, the speech signals are still susceptible to background noise due to the fact that the calls transmitted digitally originate from noisy environments.

The corrupted speech signal is then processed to determine a plurality of distortions derived from a plurality of distortion measures based on the plurality of speech reference vectors, as shown at block 54. The plurality of distortion measures include the distortion measures listed above and any other known distortion measures.

A non-linear model is then provided for receiving the plurality of distortions measure at a plurality of inputs and determining a subjective score, as shown at block 56. The subjective score can then be used as an indication of user acceptance of speech signals recorded under varying noise conditions and channel impairments as well as signals subjected to various noise suppression/signal enhancement techniques.

While the best modes for carrying out the invention have been described in detail, those familiar with the art to which this invention relates will recognize various alternative designs and embodiments for practicing the invention as defined by the following claims.

What is claimed is:

1. An output-based objective method for evaluating the quality of speech in a voice communication system comprising:

providing a plurality of speech reference vectors, the speech reference vectors corresponding to a plurality of known clean speech samples obtained in a quiet environment;

receiving an unknown corrupted speech signal from an unavailable clean speech signal that is corrupted with distortions;

determining a plurality of distortions by comparing the unknown corrupted speech signal to at least one of the plurality of speech reference vectors; and generating a score representing a subjective quality of the unknown corrupted speech signal based on the plurality of distortions.

2. The method as recited in claim 1 wherein generating the score includes processing the plurality of distortions in a neural network having a plurality of inputs and an output.

3. The method as recited in claim 2 wherein the neural network is a three-layer network.

4. The method as recited in claim 3 wherein generating the score includes training the neural network utilizing backpropagation.

5. The method as recited in claim 1 wherein providing the plurality of speech reference vectors includes:

receiving a plurality of clean speech samples in the quiet environment;

performing a spectral analysis on the plurality of clean speech samples in a plurality of domains to generate analyzed speech samples; and performing a clustering technique on the analyzed speech samples.

6. The method as recited in claim 5 wherein the clustering technique is a vector quantization.

7. The method as recited in claim 5 wherein the clustering technique is a k-means clustering technique.

8. The method as recited in claim 5 wherein performing the spectral analysis includes performing a linear predictive analysis.

9. The method as recited in claim 5 wherein performing the spectral analysis includes performing a perceptual linear predictive analysis.

10. An output-based objective system for evaluating the quality of speech in a voice communication system comprising:

a plurality of speech reference vectors, the speech reference vectors corresponding to a plurality of known clean speech samples obtained in a quiet environment;

means for receiving an unknown corrupted speech signal from an unavailable clean speech signal that is corrupted with distortions;

means for determining a plurality of distortions by comparing the unknown corrupted speech signal to at least one of the plurality of speech reference vectors; and a non-linear model responsive to the plurality of distortions to generate a score representing a subjective quality of the unknown corrupted speech signal.

11. The system as recited in claim 10 wherein the non-linear model is a neural network having a plurality of inputs and an output.

12. The system as recited in claim 11 wherein the neural network is a three-layer network.

13. The system as recited in claim 12 wherein the neural network is trained utilizing backpropagation.

14. The system as recited in claim 10 further comprising:

means for receiving a plurality of clean speech samples in the quiet environment;

means for performing a spectral analysis on the plurality of clean speech samples in a plurality of domains to generate analyzed speech samples; and means for performing a clustering technique on the analyzed speech samples to generate the speech reference vectors.

15. The system as recited in claim 15 wherein the means for performing the clustering technique includes means for performing a vector quantization.

16. The system as recited in claim 14 wherein the means for performing the clustering technique includes means for performing a k-means clustering technique.

17. The system as recited in claim 14 wherein the means for performing the spectral analysis includes means for performing a linear predictive analysis.

18. The system as recited in claim 14 wherein the means for performing the spectral analysis includes means for performing a perceptual linear predictive analysis.

19. A computer readable storage medium having information stored thereon representing instructions executable by a computer to evaluate the quality of speech in a voice communication system, the computer readable storage medium further comprising:

instructions for providing a plurality of speech reference vectors, the speech reference vectors corresponding to a plurality of known clean speech samples obtained in a quiet environment;

instructions for receiving an unknown corrupted speech signal from an unavailable clean speech signal that is corrupted with distortions;

instructions for determining a plurality of distortions by comparing the unknown corrupted speech signal to at least one of the plurality of speech reference vectors; and instructions for generating a score representing a subjective quality of the unknown corrupted speech signal based on the plurality of distortions.

20. The computer readable storage medium of claim 19 wherein the instructions for generating the score further comprise:

instructions for providing a multi-layer perceptron neural network for processing the plurality of distortions.

* * * * *